United States Patent [19]

Patten

[11] 4,130,739

[45] Dec. 19, 1978

[54] CIRCUITRY FOR COMPRESSION OF SILENCE IN DICTATION SPEECH RECORDING

[75] Inventor: Michael A. Patten, San Jose, Calif.

[73] Assignee: International Business Machines Corporation, Armonk, N.Y.

[21] Appl. No.: 804,955

[22] Filed: Jun. 9, 1977

[51] Int. Cl.$^2$ .................... G11B 19/02; G11B 5/00
[52] U.S. Cl. ............... 179/100.1 VC; 179/100.1 DR; 360/8; 360/74
[58] Field of Search ............... 360/8, 74; 179/1 VC, 179/100.1 VC, 100.1 DR

[56] References Cited

U.S. PATENT DOCUMENTS

| | | | |
|---|---|---|---|
| 2,952,012 | 9/1960 | Rodgers et al. | 340/347 |
| 3,104,284 | 9/1963 | French et al. | 179/15.55 |
| 3,476,885 | 11/1969 | Shiber et al. | 179/100.2 |
| 3,499,996 | 3/1970 | Klayman et al. | 179/15.55 |
| 3,582,559 | 6/1971 | Hitchcock | 179/15 B |
| 3,712,959 | 1/1973 | Fariello | 179/1 VC |
| 3,723,667 | 3/1973 | Park, Jr. et al. | 179/100.1 |
| 3,763,328 | 10/1973 | Lester et al. | 360/8 |
| 3,816,664 | 6/1974 | Koch | 179/15.55 T |
| 3,832,491 | 8/1974 | Sciulli et al. | 179/1 VC |
| 3,869,708 | 3/1975 | Schiffman | 360/8 |
| 3,890,467 | 6/1975 | Sciulli | 179/1 VC |
| 3,921,209 | 11/1975 | Yoshino et al. | 360/32 |
| 3,934,094 | 1/1976 | Kobayashi et al. | 179/15.55 T |
| 3,941,982 | 3/1976 | Knollenberg et al. | 235/92 DP |
| 3,972,603 | 8/1976 | Lubinec | 179/100.1 VC |
| 4,000,517 | 12/1976 | Brickerd, Jr. | 179/100.1 VC |
| 4,008,375 | 2/1977 | Lanier | 179/1 VC |

OTHER PUBLICATIONS

Jankowski, Jr. "A New Digital Voice-Activated Switch" Comsattech. Review, vol. 6, No. 1, pp. 159-178, Spring 1976.

Primary Examiner—Alfred H. Eddleman
Assistant Examiner—Donald McElheny
Attorney, Agent, or Firm—George E. Roush

[57] ABSTRACT

Dictating apparatus is enhanced for normal and conference speech recording by simple circuitry for detecting "long periods of silence" and compressing the record during these periods, as for example by discontinuing the recording process. Starting and stopping the recording transducing apparatus is a basic concept. Conventional recording apparatus is adapted to function under control of circuitry using available digital circuit modules. Analog speech and like waves are converted to incremental digital form by delta modulating circuitry. "Silence periods" are recognized by digital sensing circuitry coupled to triggering logical control circuitry for operating the recording apparatus only in the presence of desired sound. Basically a predetermined series of indications of "silence" serve to trigger a latching flip-flop circuit for disabling substantially conventional dictating apparatus and the like until the desired sound resumes and the latching circuit is reset for continuing the recording of dictation. The same subcircuitry is applicable to analog or digital recording apparatus. Several embodiments are described within respect to additional desirable features.

9 Claims, 5 Drawing Figures

CIRCUITRY FOR COMPRESSION OF SILENCE IN DICTATION SPEECH RECORDING

The invention relates to recording systems for recording information in an environment wherein relatively long periods of silence, or other absence of desired information, may occur, and it particularly pertains to control of such recording systems automatically in response to the detection of silence periods, although other applications of the basic system of the invention will occur to those skilled in the art.

An application of the system of the invention is found in the recording of speech as in the dictation of information for later transcription by a stenographer. In conventional dictating apparatus a speaker in dictating operates a "press-to-talk" momentary contact switch suitable for turning the apparatus on as he speaks and then turning it off by releasing the switch as he gathers thought for the next dictating period in order to save space in the recording medium and to provide better continuity for the transcriber. While this arrangement has been considered satisfactory by most for years, the speaker is obliged to give up virtually the use of one hand and to divert some, albeit subconscious, effort toward the control of the apparatus and consequently away from the creative effort. The recording of the minutes of a conference of two or more members multiplies these disadvantages with respect to at least one member of the group and usually adds a further disadvantage of confusion among the members as to the control of the apparatus.

The prior art directed to recording speech, and other sounds, contains much information on the possibilities of overcoming at least some of the disadvantage enumerated, but somehow a simple and effective arrangement for modifying the low cost dictating equipment presently available appears to have been overlooked.

The invention contemplates the operation of conventional dictating apparatus with but little modification to the apparatus and comprising the incorporation of circuitry for automatically sensing relatively long periods of silence and for interrupting the recording process during such "silence periods" to the end of reducing the space on a given recording medium which is ordinarily devoid of information and to the end of freeing a hand of the dictator as well.

As used hereinafter, as either a noun or as an adjective, the term "silence" is to be construed as specific to the "intended forbearance" from speech or any other intended sound including noise if that be intended and/or the evidence of such intended forbearance as determined by electronic circuitry, while as used hereinafter, as an adjective the term "silent" is to be construed as having the usual dictionary definition except that, in context, a threshold of ambient noise also may be involved.

Prior art pertinent to an understanding of the state-of-the-art bearing on the invention is found in the U.S. Pat. Nos. listed:

2,952,012 9/1960, Rodgers, et al.; 340/347;
3,104,284, 9/1963, French, et al.; 179/15.55;
3,476,885, 11/1969, Shiber, et al.; 179/100.2;
3,499,996, 3/1970, Klayman, et al.; 179/15.55;
3,582,559, 6/1971, Hitchcock, et al.; 179/15B;
3,723,667, 3/1973, Park, et al.; 179/100.1;
3,763,328, 10/1973, Lester, et al.; 360/8;
3,816,664 6/1974, Koch; 179/15.55T;
3,869,708 3/1975, Schiffman; 360/8;
3,921,209 11/1975, Yoshino, et al.; 360/32;
3,934,094 1/1976, Kobayashi, et al.; 179/15.55T;
3,941,982 3/1976, Knollenbert, et al.; 235/92DP.

And in the published literature:

Lee, Francis F.; "Time Compression and Expansion of Speech by the Sampling Method;" Journal of the Audio Engineering Society; Vol. 20, Nr. 9; November 1972; pp 738–742.

The patent to Rodgers et al. is directed to an Analog-to-Digital (A/D) data converter having components similar to those of the silence data detection and compression arrangement of the invention but goes no further toward the detection of long silence periods and subsequent control of a recording system.

The patents to French et al., to Koch and to Klayman et al., are directed to temporal modification of audio waves by determing duplicated portions of waveforms for compression and later expansion but does not sense silence periods as such for elimination from the message. Klayman et al. do sense a difference between voiced and "unvoiced" waveforms and changes frequency and bandwidth thereby.

The patents to Shiber et al., Lester et al., to Schiffman, to Hitchcock and the publication to Lee disclose concepts of simple control of recording mechanisms in response to a predetermined signal or an easily recognized characteristic, which may not be too unlike "silence" as contemplated in accordance with circuitry of the invention. The publication, indeed specifically discusses the "elimination of overlong pauses," but deprecates the possibolities of successfully controlling speech recording in accordance therewith. None of these references disclose any circuitry for performing the desired functions in the manner of the various embodiments of the invention as will be appreciated upon reading the description hereinafter.

The patents to Yoshino et al., to Kobayashi et al., and to Knollenberg et al. disclose digital data recording with delta modulation converting circuitry and sampling in response to and only during the occurence of an "event." These state-of-the-art references only broadly allude to the functioning of the circuitry according to the invention and do not even remotely suggest the practical novel subcircuitry for embodying the invention.

The patent to Park et al. perhaps (representing the closest art) is directed to a speech compression circuit arrangement for a recording operation wherein power to recording drive means is interrupted in the absence of speech signal much as in the example given in accordance with the invention. A plurality of speech detecting analog waveform circuits are arranged to apply power for recording in the presence of speech and when speech is undetected the power drops off as contrasted to the scheme according to the invention wherein a positive indication of slience is obtained for interrupting the recording process with simple digital circuits operable on either analog or digital representation of analog waveform. The unobvious simplicity of practical embodiments of subcircuitry according to the invention will be apparent upon inspection of the description of the embodiments hereinafter.

The objects of the invention indirectly referred to herein-before and those that will appear as the specification progresses, obtain according to the invention by circuitry for temporally storing sound intelligence on a record medium in time periods wherein intelligence is present and halting the recording in time periods of silence.

Voice frequency waves, such as generated at a microphone, to be recorded on a substantially conventional recorder, either in analog or digital form, are applied also with a clocking pulse wave to a delta modulator circuit which delivers a binary 1 or 0 output corresponding to successive increases or decreases in the amplitude of the voice wave and alternate successive 1 and 0 signifying no changes in amplitude. If the output of the delta modulator is "silence," the pattern will be repeated alternate 1 and 0. A "silence" detector will respond to this pattern and deliver a logical level so indicating a "silence word."

In analog recording voice waves are applied to the recorder in conventional manner and the analog voice waves are simultaneously applied to silence compression subcircuitry according to the invention. In digital recording the recorder is, of course, a conventional digital recorder with the same compression sub-circuitry, but other components are present for digitizing the voice waves.

The silence compression subcircuitry according to the invention further comprises logical circuitry responsive to the output levels of the silence detector for the control of the recorder in several aspects. For digital recording the first "silence word" may be recorded for subsequent control of the reproducing operation as will be described in detail hereinafter. For analog recording, "silence words" are seldom recorded and greater leeway is allowed in the determination of silence with respect to sound.

In order that full advantages obtain in the practice of the invention, preferred embodiments thereof, given by way of example only, are described in detail hereinafter with reference to the accompanying drawing, forming a part of the specification, and in which.

Figure 1:
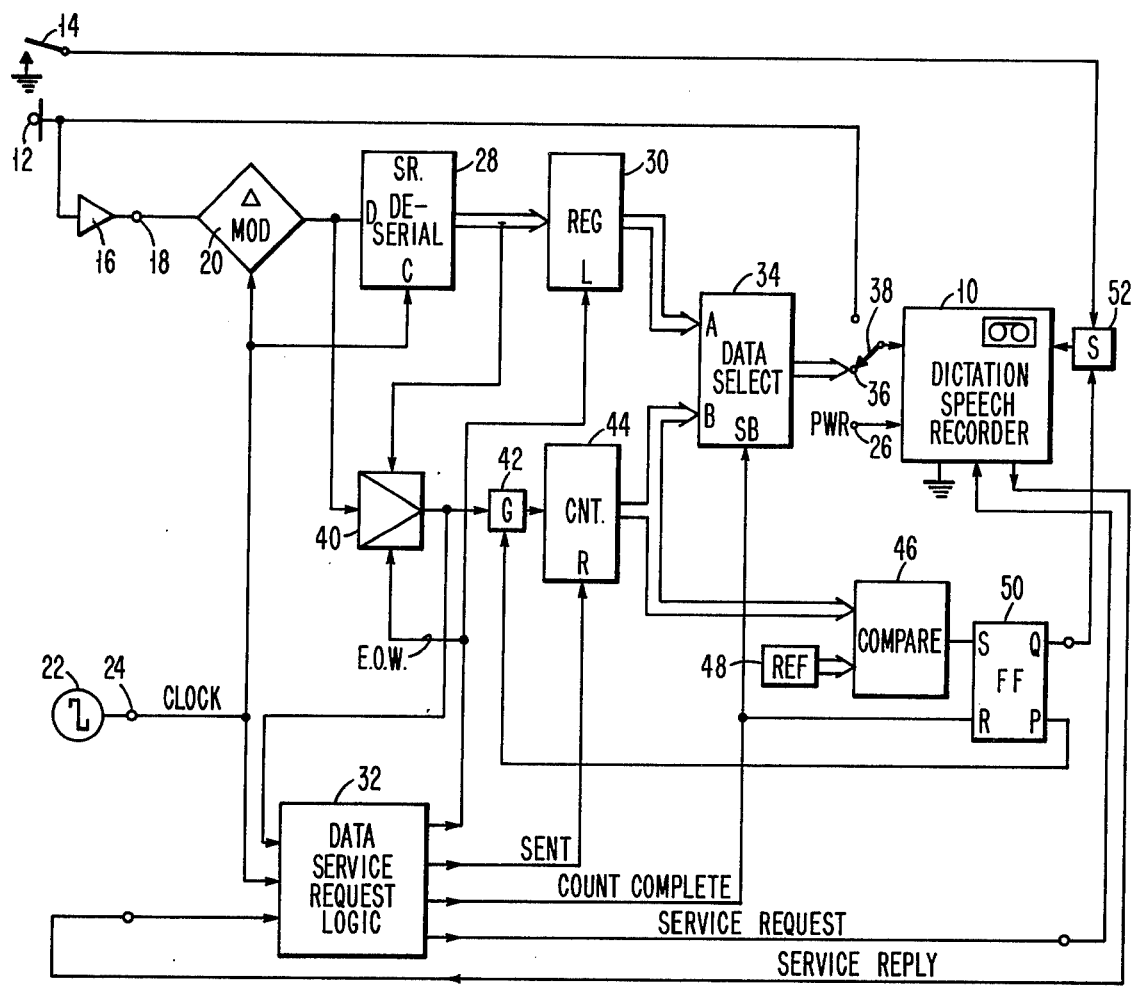
FIG. 1 is a functional diagram of circuitry for compressing "silence" in sound recording acccording to the invention.

One embodiment according to the invention of a silence data compression arrangement for dictated speech and/or the like sound recording which reduces the storage requirement with a low outlay for components is depicted in FIG. 1. Voice frequency waves to be recorded on a substantially conventional recorder 10, either in analog or digital form, are generated at a microphone 12. Usually a hand-operated control switch 14 is available at or near the microphone. The recorder 10 is normally powered when the recording operation is initiated but actual recording in the store normally takes place only when the switch 14 is activated. In typical apparatus record media are moved by drive motors in the recording process only when one or more electric switches are activated. In the interest of clarity, this criterion is met by grounding the lead connected to the switch 14 as shown. Such an arrangement is common, but the artisan will adapt any one of a number of well known arrangements to suit the purpose at hand. The invention is directed to circuitry for controlling the recording into store in response to the presence and absence of "silence" as determined by circuitry to be described for working into practically any control circuit, but which will be described in conjunction with equivelant circuitry effecting the closing of the switch 14, by way of example only. As shown in FIG. 1 sound, as from the microphone 12, is applied to an isolating circuit which preferably is in the form of a conventional audio frequency amplifying circuit 16. Preferably this sound is applied at input terminals 18 to a delta-modulator circuit 20. A clocking pulse wave derived from a conventional squarewave generator 22 is applied at terminals 24 alternately a clocking pulse wave obtained from circuitry within the recorder 10 responsive to alternating current input power at terminals 26 of the recorder is applied at terminals 24. A 20 KHz clocking frequency is adequate with 4 KHz bandwidth recording; the frequency depends on the quality of sound and of the component parts used. The sound and clocking pulse waves are translated to a delta modulator circuit 20 which thereupon delivers an output comprising a binary 1 or 0 corresponding to successive increase or decrease in the amplitude of the voice wave respectively and alternate successive 1 and 0 signifying no change in amplitude.

Figure 2:
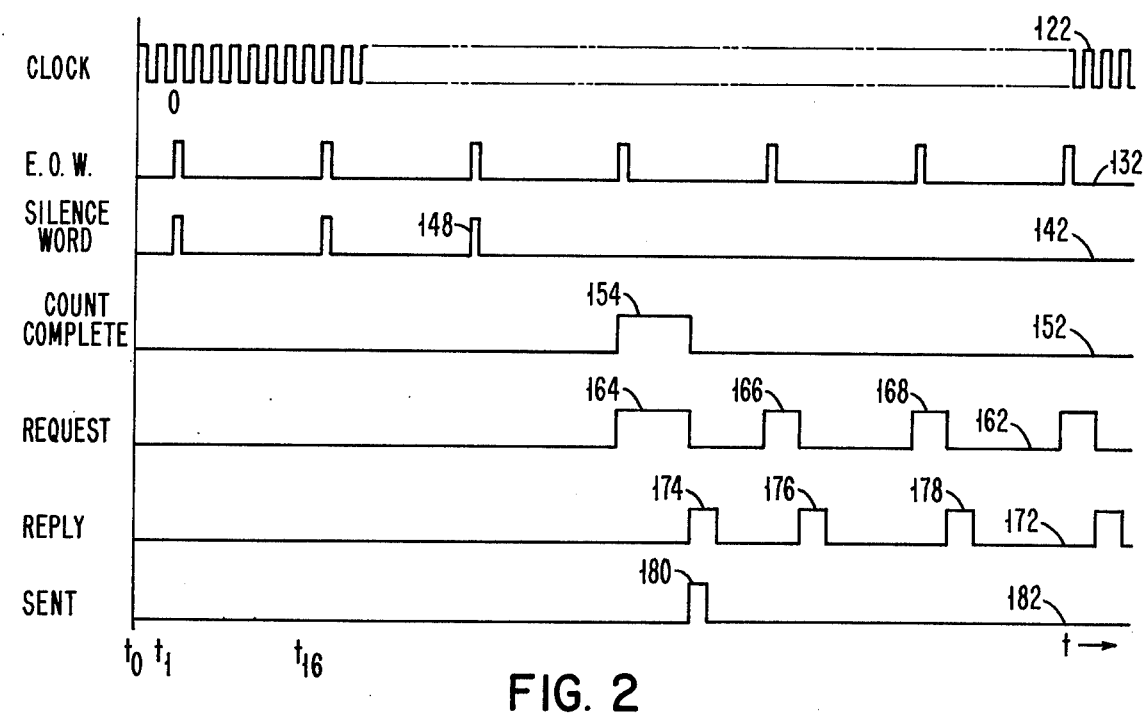
FIG. 2 is a graphical representation of wave forms useful in an understanding of the operation of the silence compressing circuitry.

For a digital recording system the serial data output from the delta modulator 20 is applied to a deserializing shift register circuit 28 from which serial-by-bit data is presented in parallel to a register 30. This register preferably is loaded at the end of each series of 16 bits forming a word inasmuch as 16-bit components are more readily available commercially, but words of other lengths are used alternatively. The words are separated by the action of a logical control circuit arrangement 32 which generates a series of timing waves in response to the basic wave from the generator 22 as will be described more fully hereinafter. The logical control circuit arrangement 32 comprises an arrangement of conventional counting, gating and like circuit components for timing the operation; for example, by generating waves as shown in FIG. 2. Those skilled in the art will assemble the components from commercially available stock to suit the application at hand. For example, an end-of-word (EOW) pulse is generated after every 16th, or multiple of every 16th, clock pulse by a simple counter. The word in the register 30 is then transferred through selector circuitry 34 to output lines and terminals 36 for application to the recorder 10, by way of a switch 38, for example, where the recorder 10 is arranged for either digital or analog recording. Analog recording does not require the use of the registers 28 or 30 or the data selecting subcircuitry 34.

If the output of the delta modulator 20 is a "silence" word, the pattern will be 101010 . . . 10. A "silence" detector circuit 40 is arranged to respond to this pattern and increment a counter 44 for translating a 16 bit "silence word" to the selector circuitry 34 and at the completion of the count the selector circuitry 34 is switched and the "silence word" is transferred to the output lines for recording.

The output of the silence detector 40 is a bit or a level indicating that sound is present or that "silence" is present in the absence of sound. This level is gated as required through gating circuit 42 to a counting circuit 44. A 16 bit word accumulated in this counter circuit is transferred to the selector circuitry 34. Only one such silence word is recorded for later use in applications wherein the record is reproduced to indicate that such silence periods had occurred. One such application is that wherein the record is transmitted over a wire or a radio circuit before being transcribed by a stenographer. Output bits from the counting circuit 44 are also transferred to a comparing circuit 46 to which a predetermined reference word is applied from a reference word generating circuit 48. The reference word is one which indicates the desired differential between sound and silence for the application at hand, in contra-distinction to a short 1 0 series resulting from a portion of the signal being at a given amplitude for a short time. Upon an equals compare in the circuit 46 an electric level is up to set a latching flip-flop circuit 50. The complementary output terminals—Q and P (=Q̄)—of the flip-flop circuit 50 control the gating circuit 42 and the recorder 10 through a switching circuit 52. For example as shown, the Q output terminal of the latching circuit 50 is connected to the switching circuit 52 and the complementry P output terminal is connected to the gating circuit 42.

FIG. 2 is a graphical representation of wave forms typical of operation of circuitry according to the invention as embodied in the previously described arrangement. A clocking pulse wave is represented by a curve 122, every sixteenth pulse of which is used as an E.O.W. pulse wave represented by a curve 132. A silence word indication is graphically represented by a curve 142 wherein a relatively long pulse 154 is generated at the first instance of silence when a silence word pulse fails to appear. For insuring synchronization, a request signal, represented by a curve 162, is generated with an initial pulse 164 reflecting the pulse 154, and following pulse 166, 168 . . . , all triggered at the leading edge of E.O.W. pulses. A reply pulse wave, represented by a curve 172, is returned to the logical circuit 52 which is arranged to formulate a "sent" pulse 180 are represented by a curve 182 for resetting the counter 44.

Thus, for digital operation the analog wave output of the amplifying circuit 16 is applied at the input terminal 18 and the digitized form is delivered at terminals 36. Simultaneously "silence" is determined by detecting a word of silence (alternate 1 and 0) coming from the delta modulator 20 and allowing this word to be stored normally. A count is then made of subsequent silence words. During the counting no words are stored. When the first sound or non-silence word is detected, a storage cycle is initiated and the count is stored just following the first silence word which was stored. If the non-silence word just detected is completely deserialized before the count storage cycle is complete the request for this word is qued and presented immediately following the count storage cycle. Deserializing and storing of subsequent non-silence words proceeds normally until the next group of silence words or the end of the operation.

If the word following the first silence word is a non-silence word, the silence detector detects it as silence. This prevents the compression scheme for actually using more storage than required without compression in cases where the modulated signal is at the threshold level of silence causing short bursts of silence (less than two words) to be reproduced. It also improves compression as the signal passes through the threshold level.

To reduce the probability of overun, a one word buffer is employed. When the first non-silence word is detected after a string of silence words has been counted, the count and the non-silence word must be stored in succession. To improve the timing of this operation the silence cycle to store the count is initiated as soon as it has been determined that the word currently being deserialized is non-silence; it waits only for the first break in the digit pattern representing silence periods. The result of this operation is data in storage in the recorder representing non-silence periods and a silence word followed by a count of at least two representing silence periods.

With either mode of recording, the silence period compression circuitry is used to control the recording. The delta modulator 20 is used to digitize the analog signal whereby silence is indicated by a 01010101 signal pattern. This pattern is sensed by the "silences" detector 40 and the silence count is stored in the counter 44. When the count in the counter 44 is equal to a predetermined reference count in a reference count generator 48, which is equivalent to the maximum derived duration of silence, the count comparing circuit 46 comes up to set the latch 50. The complementary Q (P) output of the latch 50 disables the gate 42 so that no further silence counts are accumulated. When the silence pattern 1010 no longer exists, the count complete line comes up to reset the latch 50 and the service request line comes up which causes circuitry in the recorder 10 to send a service reply pulse to the data service request logic 32 for resetting the circuitry for the succeeding compression operation.

Figure 3:
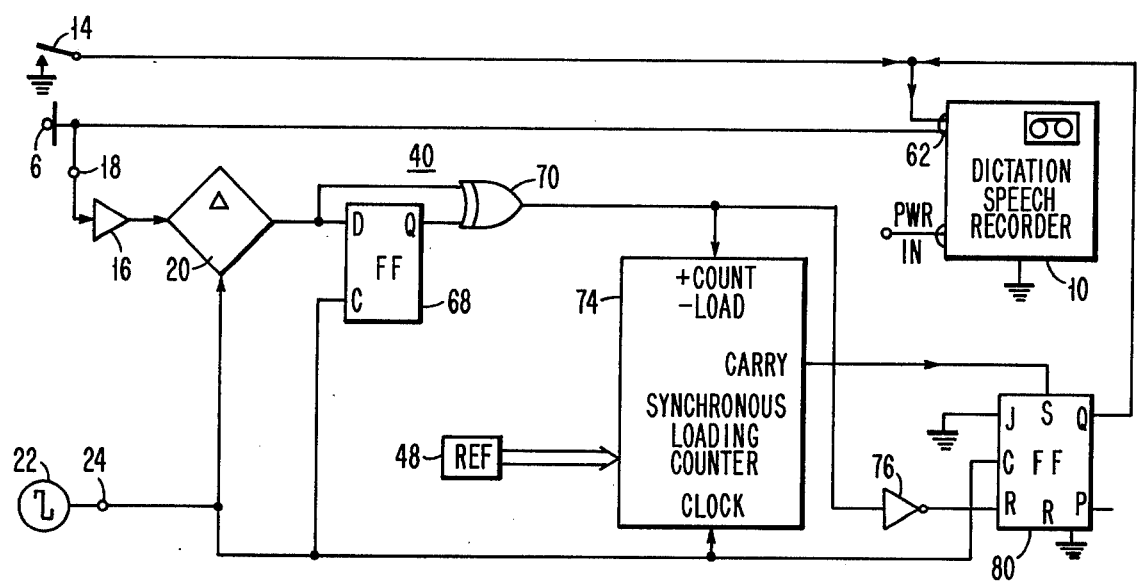
FIG. 3 is a functional diagram of a simplified circuit arrangement according to the invention.

FIG. 3 depicts a silence data compression arrangement for dictated speech and like waves which reduces the storage requirement for substantially conventional analog recording systems.

Voice frequency waves to be recorded on a recorder 10 in analog form are generated at a microphone 12, and applied at input plug terminals 62. Normally, conventional dictation recorders have a press-to-talk switch 14 arranged in the microphone mounting and connect into the recorder through the same input plug terminal. Such connections are contemplated with circuitry according to the invention, but other known connections are available to the artisan. Likewise one contact of the switch 14 is shown as fixed at ground reference potential in the interest of clarity, but other arrangements are available. In practice the circuitry according to the invention to be described, preferably, is arranged within the case of the recorder 10 since it is quite small in size and dissipates minimal heat only.

The advantages of the invention obtain for analog recording apparatus with simple circuitry based on principles set forth hereinbefore for digital recording. The analog wave as from the microphone 12 is applied at input terminals 18 and amplified in an isolating amplifying circuit 16. A clocking pulse wave derived from a suitable generator 22 is applied at terminals 24. These waves are translated to a delta modulator circuit 20 which delivers a binary 1 or 0 output corresponding to successive increases or decreases in the amplitude of the voice wave and alternate successive 1 and 0 signifying no changes in amplitude.

The serial data output from the delta modulator 20 is applied to a "silence" detector 40 comprising a Data-Clocked (D-C) flip-flop circuit 68 connected to the delta modulator circuit 20 for storing each successive bit for one bit interval and an exclusive OR (XOR) gating circuit 70 for comparing the present and immediately subsequent bits from the delta modulator at clock pulse time.

The output of the delta modulating circuit 20 is connected to an input terminal of a conventional Synchronous Loading Counting (SLC) circuit 74 and to an inverting circuit 76, the latter of which is connected in turn to the K terminal of a conventional J-K flip-flop circuit 80. The SLC circuit 74 has a clock input terminal connected to the generator 22 and a carry output terminal connected to the set terminal of the J-K flip-flop circuit 80. A reference numeral generator 48 is connected as before to the SLC circuit 74. The Q output terminal of the latching flip-flop circuit 80 is connected to the switch 14. The Q output terminal of the flip-flop circuit is up when "silence" has been established. When the Q output terminal of the flip-flop circuit 80 is down, signifying that sound is available for recording, the Q output terminal is electrically down at ground level. Thus the switch 14 is shunted by another circuit to ground and the recorder 10 is recording. Preferably, the flip-flop circuit 80 is constructed of TTL family components, which components lend themselves to such switching applications.

Figure 4:
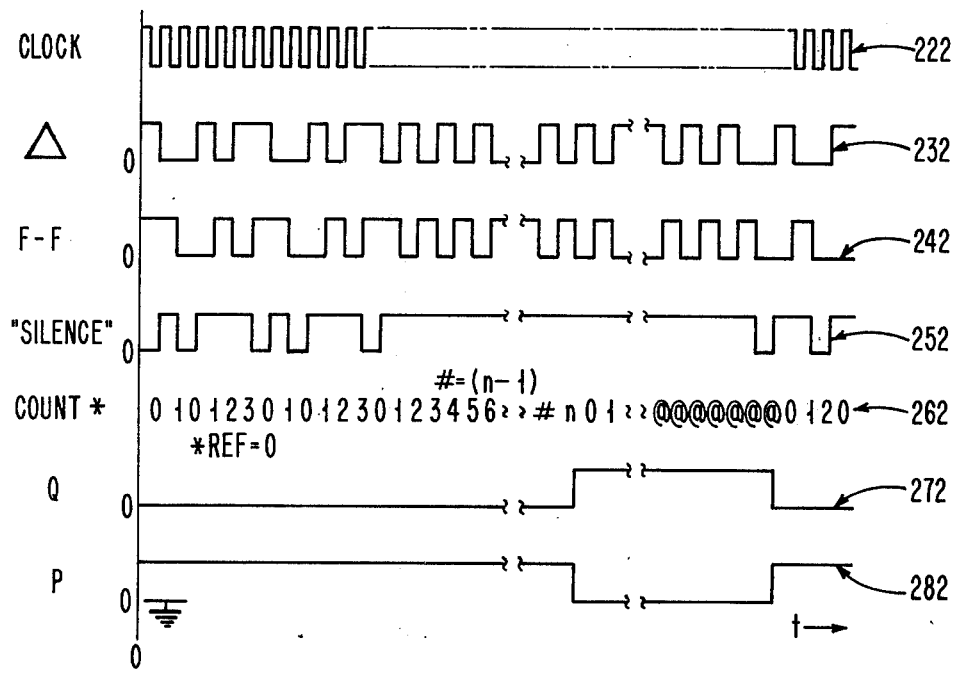
FIG. 4 is a graphical representation of wave forms useful in an understanding of the operation of the simplified circuits arrangement.

FIG. 4 is a graphical representative of waveforms for the previously described embodiment. A clock pulse wave is represented by a curve 222. The output of the delta modulating circuit 20 is represented by a curve 232 and that of the flip-flop circuit 68 by the following curve 242. The resulting output of the XOR 70 is then represented by a curve 252. The count in the counter 90 (where REF 48 is zero) is indicated by the 10 (decimal) number on line 262, wherein any values of the numerals @ are inmaterial. The complementary outputs at terminals Q and P of the J-K flip-flop circuit 80 are represented by curves 272 and 282 respectively.

The reference number placed in the reference register 48 is the number of pulses to be subtracted from the total count of pulses in the SLC 74 for the application at hand. This reference number is chosen for adjusting the desired delay period. The higher the reference number the shorter is the delay time. An alternative view and arrangement more readily used is that of the complement of the number, which is then directly proportional to the delay.

The electronic subcircuitry according to the invention operates to reflect "silence" or "sound" in a period of the order of 1 millisecond, which time is short as compared to the time a human operator changes his mode accordingly. The conventional dictating machine may be slower by a factor of 100, however, but those skilled in the art will recognize the steps to be taken with the application at hand to avoid loss of speech, especially at the beginning of a dictating period.

Figure 5:
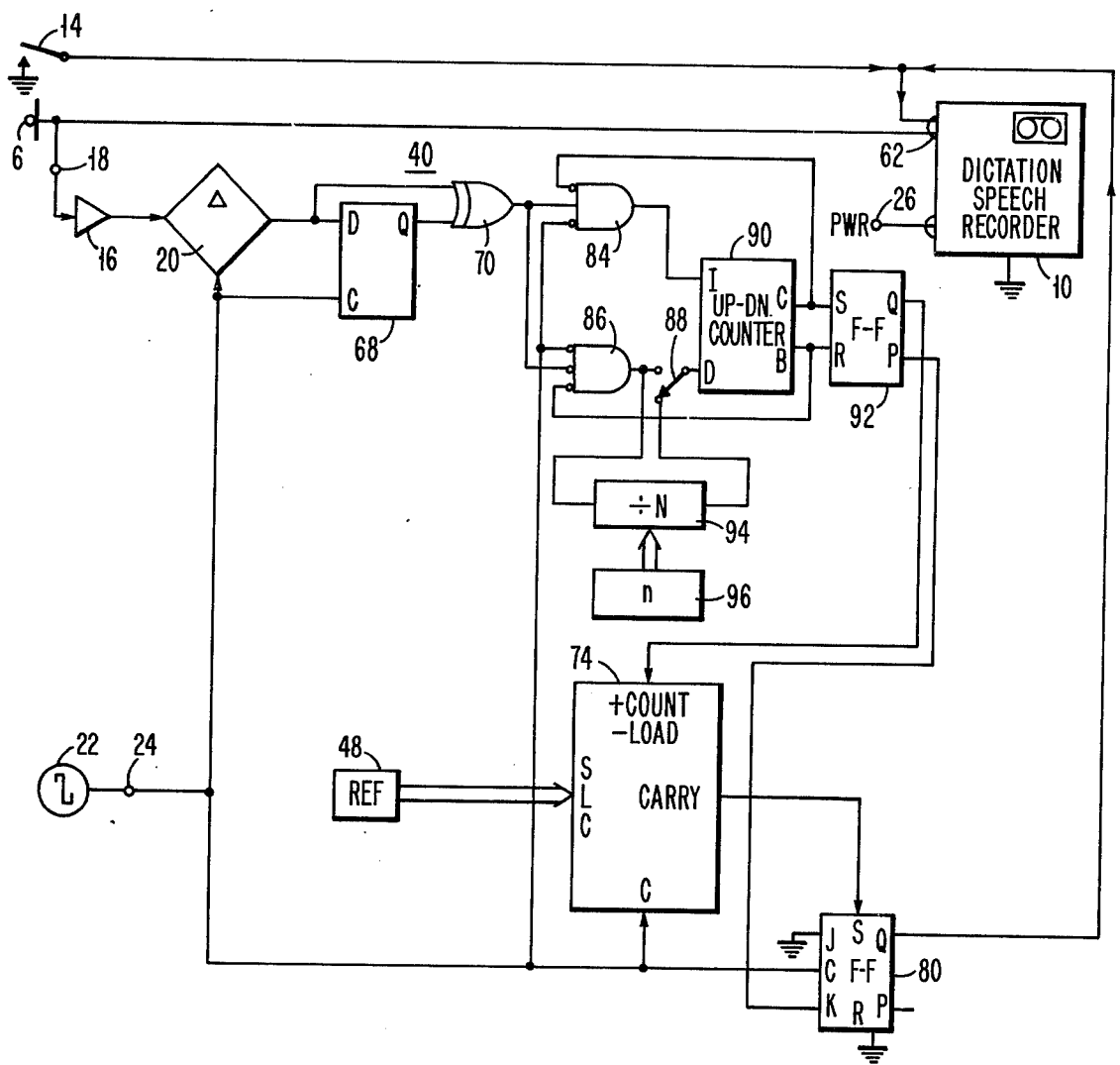
FIG. 5 is a functional diagram encompassing alternate embodiments of silence compressing circuitry according to the invention.

Desirable refinements are afforded with two alternate embodiments diagrammed in FIG. 5. Additional logical circuitry is interposed between the XOR gating circuit 70 and the counting circuit 74 of the previously described embodiment that allows some irregularity in the 101010 silence indicating train without switching the mode of operation. The output lead of the XOR gating circuit 70 is also connected to input leads of AND gating circuits 84 and 86 with the latter having inverting input terminals. The clocking wave from the terminal 24 is also applied to inverting input leads of both AND gating circuits 84, 86. The output lead of the AND gating circuit 86 is connected by way of a switch 88 in the appropriately closed condition to a decrementing input terminal of an up-down, or reversible, counting circuit 90 having an incrementing input terminal connected directly to the output lead of the other AND gating circuit 84. The counter 90 has carry and borrow terminals which are connected respectively back to inverting input leads of the AND gating circuits 84, 86 and to set and reset terminals of a bilateral flip-flop circuit 92. The errect output Q terminal of the latter is connected to the input terminal of the counter circuit 74 and the inverted output P terminal is connected to the K terminal of the J-K flip-flop circuit 80.

The Counter 90 adds a hysteresis function to the detection of silence. That is, once silence is detected a certain amount of activity or "non-silence" is necessary to be detected as such. Also, once "non-silence" is detected a certain amount of silence is necessary before silence detection occurs. Another function of the counter 90 is to provide a silence detection threshold level. For example, if silence and non-silence average out to be in a 1:1 ratio the counter, for a given period of time will be incremented and decremented equally causing its average value to remain unchanged. Therefore, the latch 92 will remain unchanged. This is the threshold of silence detection since any more silence in proportion to non-silence will cause the counter to ultimately generate the carry signal and any less silence will cause the counter to ultimately generate the borrow signal, thus setting and resetting the silence latch 92 respectively. The function of the divide by N is to make the "silence detection ratio" 1:N instead of 1:1. This is due to the divide by N function performed on the non-silence pulses generated by the AND gating circuit 86. Thus, the threshold of silence detection may be adjusted digitally to compensate for unusually noisy environments.

An (N) dividing circuit 94 has input and output terminals connected between the AND gating circuit 86 and the counter 90 with the switch 88 in the other closed position as shown. Loading terminals of the dividing circuit 94 are connected in multiple to a reference number (n) circuit 96. This circuitry is effective when the switch 88 is appropriately thrown to allow continuing operation in the silence mode when n out of N 10101010 alternations at least are sensed. This circuit arrangement provides even greater flexibility when needed, such as in operation in an extremely noisy environment, for example one in which the sharp clatter of a typewriter is present.

While the invention has been shown and described with reference to specific embodiments thereof, it should be understood that those skilled in the art will make changes without departing from the spirit and scope of the invention as defined hereinafter in the appended claims concluding the specification.

The invention claimed is:

1. Circuitry for the compression of silence in dictation speech and like electric wave recording apparatus, comprising
   a source of electric waves representing intelligence sound separated by silence periods,
   a recorder of said electric waves having a sound wave input terminal to which said source is coupled, and having electrically controllable transducing apparatus for making a record on a record medium and having an input terminal at which a control electric level is to be applied,
   a source of clocking wave,
   a delta modulator circuit having a carrier wave input terminal to which said source of clocking wave is connected, signal wave input terminals connected to said sound wave input terminals and a binary data output terminal, one flip-flop circuit having input terminals connected to said binary data output terminal and to said carrier wave input terminal, and having an output terminal, an eXclusive OR (XOR) gating circuit having one input lead connected to said binary data output terminal, another input lead connected to said output terminal of said flip-flop circuit, and having an output lead, and a counting circuit coupled to said output lead of said XOR gating circuit and having at least one output lead for producing an electric potential indicative of a predetermined count, at least one other flip-flop circuit having input terminals coupled to said output lead of said counting circuit and to said carrier wave input circuit, and having at least one output terminal connected to said control electric level input terminal of said recorder, whereby said recorder is controlled in accordance with the presence of said silence periods interrupting said intelligence.

2. Circuitry for the compression of silence in dictation apparatus as defined in claim 1 and wherein
said recorder comprises
a carrier for said record medium
a motor coupled to said carrier for moving said record medium in the recording process, and
switching subcircuitry connected to said motor and to said output terminal of said one other flip-flop circuit for controlling said driving motor.

3. Circuitry for the compression of silence in dictation apparatus as defined in claim 1 and wherein
said counting circuitry interposed between said XOR gating circuit and said other flip-flop circuit is also arranged for ignoring silence period indications of duration short with respect to normal pause in dictation speech.

4. Circuitry for compression of silence in dication and like electric wave recording systems of the type comprising,
a microphone for transducing a sound wave into an electric wave,
an electric switch associated with said microphone for controlling said recording system,
a recorder of said electric wave having an input terminal coupled to said microphone for receiving said electric wave for recording and having a transducer connected to said electric switch for recording a representation of said electric wave in time disposed relationship in a record medium for later reproduction,
an electric clocking wave generating circuit for producing a clocking transition pulse wave at a corresponding output terminal,
a delta modulating circuit arrangement having a modulating wave input terminal coupled to said microphone, a carrier wave input terminal connected to said clocking wave output terminal of said generating circuit, and having an output terminal for delivering a binary output wave representing incremental changes in amplitude of said electric wave from said microphone,
a data-clocked flip-flop circuit having a data input terminal connected to said output terminal of said delta modulating circuit arrangement, having a clock input terminal coupled to said clocking wave generating circuit and having an output terminal, an eXclusive OR (XOR) gating circuit having one input lead connected to said output terminal of said delta modulating circuit arrangement, having another input lead connected to said output terminal of said flip-flop circuit, and having an output lead, a synchronous loading counting circuit having a count input terminal connected to said output lead of said XOR gating circuit, a clocking terminal connected to said clocking wave generating circuit, and a carry output terminal, and a J-K flip-flop circuit having a set terminal connected to said carry output terminal, a clocking input terminal coupled to said clocking wave generating circuit, an input terminal coupled to said output lead of said XOR gating circuit, and having an output terminal connected to said transducer and electric switch, whereby said recorder is operated temporally to reduce the record in a silence period.

5. Circuitry for the compression of silence in dictation apparatus as defined in claim 4 and incorporating
a reference number generating circuit coupled to said counting circuit,
whereby said counting circuit presents a carry at said carry output terminal only upon a count greater than the number in said reference number generating circuit.

6. Circuitry for the compression of silence in dictation apparatus as defined in claim 5 and incorporating
further subcircuitry interposed between said output lead of said XOR gating circuit and said count input terminal of said counting circuit comprising
a reversible counting circuit having incrementing and decrementing input terminals and carry and borrow output terminals,
gating circuitry having input leads individually connected to said carry and borrow terminals, to said XOR gating circuitry and to said clocking wave generating circuit and having output leads individually connected to said incrementing and decrementing input terminals, and
a further flip-circuit having set and reset terminals individually connected to said carry and borrow terminals, and an output terminal connected to said count input terminal of the first said counting circuit,
whereby occasional periods of noise short in duration with respect to the duration of the silence period are ineffective to alter control of said recorder.

7. Circuitry for the compression of silence in dictation apparatus as defined in claim 6 and incorporating
an n-out-of-N proportionating circuit interposed between said gating circuitry and said decrementing input terminal of said reversible counting circuit.

8. Circuitry for compression of silence in dictation apparatus as defined in claim 7 and wherein
said further flip-flop circuit has a complementary output terminal connected to a resetting terminal of said J-K flip-flop circuit.

9. Circuitry for compression of silence in dictation and like electric wave recording systems, comprising
a microphone for transducing a sound wave into an electric wave,
a recorder of said electric wave having input terminals connected to said microphone for receiving said electric wave for recording and input terminals for receiving alternating current power, and having a transducer for recording representations of said electric wave in time disposed relationship in a record medium for later reproduction, said recorder having incorporated therein subcircuitry for compressing an electric wave corresponding to a period of silence in the time domain in response to a control electric level presented at corresponding input terminals, said recorder having incorporated therein subcircuitry connected to said power input terminals for producing a clocking transition pulse wave at corresponding output terminals, a delta modulating circuit arrangement having modulating wave input terminals coupled to said microphone, carrier wave input terminals connected to said clocking wave output terminals of said recorder, and having output terminals for delivering a binary output wave representing incremental changes in amplitude of said electric wave from said microphone, a logical circuit arrangement connected to said clocking wave output terminals and having subcircuitry therein for developing impulses at time intervals representative of "end-of-word" groups and of "sent," and of "count complete" for delivery at corresponding output terminals, a "silence" condition sensing circuit having input terminals connected to said output terminals of said delta modulating circuit and to said end-of-word output terminals and having output terminals at which "silence" signals are delivered a counting circuit having serial input terminals, parallel output terminals and reset terminals connected to said "sent" output terminals, a gating circuit having terminals for interconnecting said sensing circuit output and said counting circuit input terminals and having control input terminals, a comparing circuit having one set of parallel input terminals connected to the parallel output terminals of said counting circuit, another set of parallel input terminals at which electric levels of prearranged "counts" are presented, and having serial output terminals, a flip-flop circuit having set input terminals connected to said output terminals of said counting circuit, reset input terminals connected to said "count complete" output terminals, and complementary output terminals individually connected to said control input terminals of said gating circuit and to said control level input terminals of said recorder, whereby said recorder is operated temporally to reduce the record in a silence period.

* * * * *